(12) United States Patent
Laper

(10) Patent No.: US 6,920,761 B2
(45) Date of Patent: Jul. 26, 2005

(54) HIGH EFFICIENCY LOW HYDROCARBON EMMISSON HYBRID POWER PLANT USING OPERATIONAL ASPECTS OF BOTH INTERNAL COMBUSTION AND JET ENGINES

(75) Inventor: Dennis A. Laper, 2365 Maple Ave., Morgan Hill, CA (US) 95037

(73) Assignee: Dennis A. Laper, Morgan Hill, CA (US)

( * ) Notice: Subject to any disclaimer, the term of this patent is extended or adjusted under 35 U.S.C. 154(b) by 134 days.

(21) Appl. No.: 10/653,612

(22) Filed: Sep. 3, 2003

(65) Prior Publication Data

US 2004/0128974 A1 Jul. 8, 2004

Related U.S. Application Data

(60) Provisional application No. 60/437,765, filed on Jan. 3, 2003.

(51) Int. Cl.[7] ................................ F02C 5/00; F02C 5/12
(52) U.S. Cl. ......................... 60/772; 60/773; 60/39.27; 60/39.81
(58) Field of Search ....................... 60/772, 773, 39.27, 60/39.76, 39.77, 39.78, 39.79, 39.8, 39.81; 431/1

(56) References Cited

U.S. PATENT DOCUMENTS

| | | | | |
|---|---|---|---|---|
| 861,329 A | * | 7/1907 | Stodola | 60/39.39 |
| 1,031,718 A | * | 7/1912 | Kasley | 60/39.39 |
| 1,731,778 A | * | 10/1929 | Holzwarth | 60/39.79 |
| 1,969,753 A | * | 8/1934 | Holzwarth | 60/39.76 |
| 1,982,665 A | * | 12/1934 | Holzwarth | 60/772 |
| 2,427,845 A | * | 9/1947 | Forsyth | 60/39.77 |
| 2,480,626 A | * | 8/1949 | Bodine, Jr. | 60/39.77 |
| 2,493,873 A | * | 1/1950 | Hill | 60/39.77 |
| 2,505,757 A | * | 5/1950 | Dunbar et al. | 60/247 |
| 2,825,202 A | * | 3/1958 | Bertin et al. | 60/247 |
| 2,872,783 A | * | 2/1959 | Frank et al. | 60/39.77 |
| 2,888,803 A | * | 6/1959 | Pon | 60/39.77 |
| 5,800,153 A | * | 9/1998 | DeRoche | 60/39.77 |

* cited by examiner

Primary Examiner—Ted Kim

(57) ABSTRACT

The method and apparatus of the present invention discloses a power plant operating at low inlet pressure and temperature using a combination of conventional internal combustion engine techniques and jet engine techniques. The combination of a unique combustion chamber design, a novel variable impedance blade set turbine and a closed loop control system allows a variable resonant frequency for combusted gases. As the resonant frequency is approached a control mechanism uses sensor data to maintain the operating point such that maximum power output is achieved for a given throttle setting. The combination of the unique combustion chamber design, multiple fuel injector/sparking device pairs, finely atomized fuel, excess oxygen and the closed loop control system further provides a very linear power curve with low exit hydrocarbon pollution levels and high fuel efficiency.

10 Claims, 9 Drawing Sheets

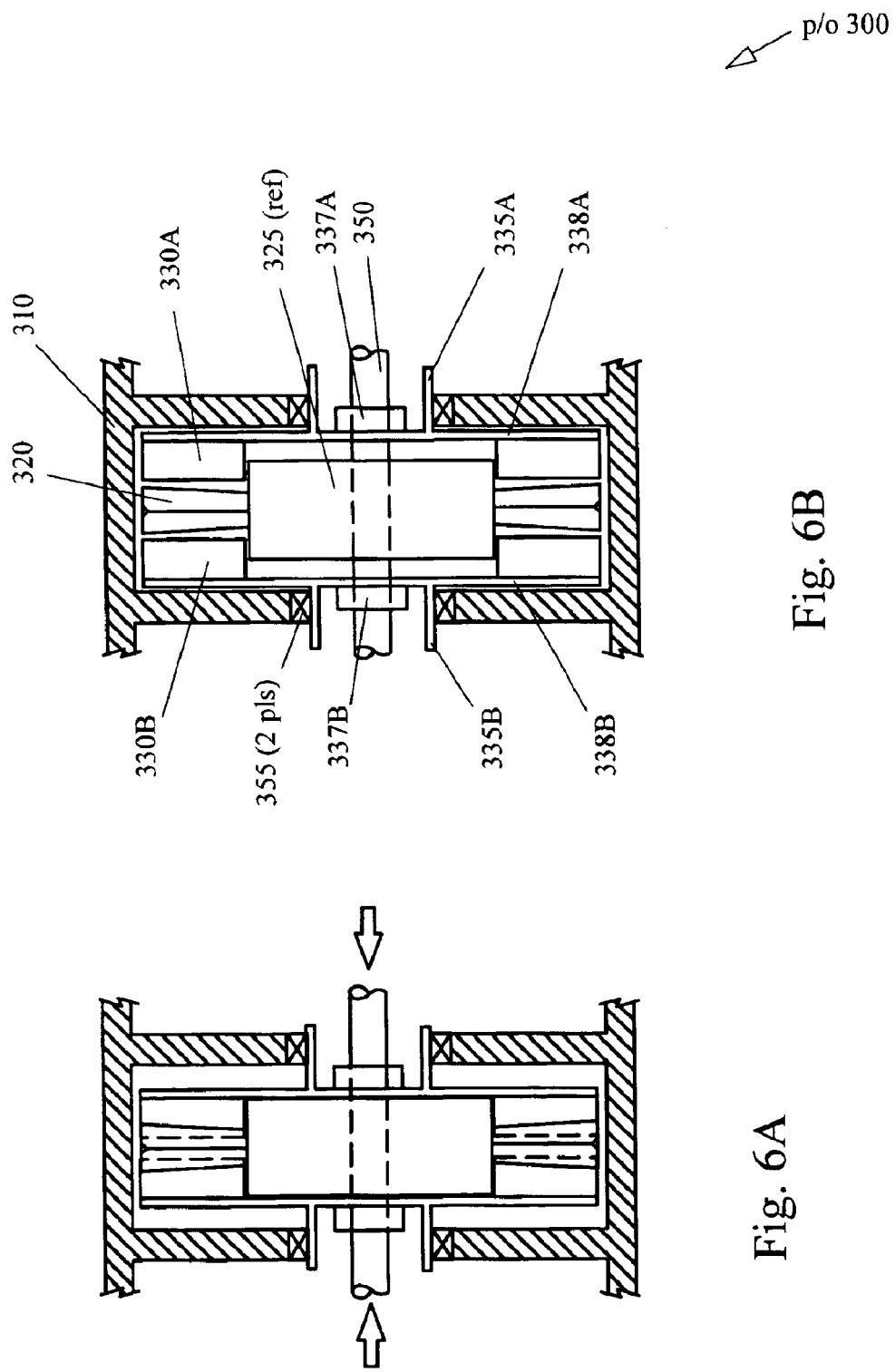

HIGH EFFICIENCY LOW HYDROCARBON EMMISSON HYBRID POWER PLANT USING OPERATIONAL ASPECTS OF BOTH INTERNAL COMBUSTION AND JET ENGINES

This non-provisional application is related to U.S. provisional patent application No. 60/437,765, filed on Jan. 3, 2003 and claims the earlier filing date thereof.

BRIEF DESCRIPTION

The subject of this invention relates to general purpose engines. Specifically, this invention concerns a novel combination of internal combustion and jet engine principles to provide a high efficiency, low hydrocarbon emission power plant suitable for a wide variety of purposes including motor vehicles, power generation, and aircraft engines among others.

BACKGROUND OF THE INVENTION

General purpose engines have been in use for well over a century. Early types included steam driven, hydro powered, and internal combustion powered engines that accomplished a myriad of tasks. Tasks such as milling, irrigation, and factory machine power were the first uses. The advent of the railroad saw steam powered engines that were powerful enough to pull very heavy loads for a relatively small physical size.

But near the end of the nineteenth century the motor vehicle made its debut, enabled by comparatively very small physical engines that produced a sufficient amount of power to drive a vehicle with passengers. While steam engines and internal combustion engines competed in the early going, the internal combustion engine became the standard based upon ease of construction, safety, and a source of cheap fuel.

Over the next century the design of the internal combustion engine was greatly improved. Diesel powered engines having high efficiency for a small size appeared. Turbo charged engines also were developed to gain power while keeping the engine size down. Other forms of fossil fuel engines have been developed that use propane, alcohol, ethanol, or a mixture of these. As long as there exists a cheap form of fuel, the internal combustion engine is the power plant of choice because it exhibits a wide range of power over its operating RPM range.

But the internal combustion engine has a number of serious drawbacks. First, the byproduct of the combustion is hydrocarbon and nitrogen oxide pollutants. These pollutants have proven to be harmful to human life and to the environment. No matter which fuel is selected, the byproduct of the combustion will be hydrocarbon effluents. Numerous techniques have been developed to reduce the level of pollutants such as MTBE (methyl tertiary-butyl ether), but due to the incomplete nature of the explosions in an internal combustion engine, coupled to the inefficient extraction of power, exhaust gases always contain pollutants.

A second drawback to internal combustion engines is inefficiency. The internal combustion engine is inefficient because the power extracted to drive a load is the result of the transformation of the energy in the combustion reaction to mechanical elements such as a pistons, crankshaft and connecting rods. For each additional piston an additional friction load is placed on the engine requiring larger cooling systems. The inefficiency is exacerbated by the heat lost in the cooling system. This dissipated heat is a direct energy loss that cannot be recaptured. A further inefficiency exists in modern internal combustion engines equipped with catalytic converters. Due to the less-than-optimum air/fuel mixture in the cylinders, unexpended fuel enters the exhaust gas flow. To reduce pollutants a catalytic converter is used to burn off this excess fuel. The energy is lost as heat. As will be described below, the method of the present invention uses the force of the combustion reaction directly to extract power to drive a load.

A third drawback of the internal combustion engine is that it is complex. Extremely tight tolerances are required in the design and manufacture of an internal combustion engine. With the advent of more restrictive pollution standards, the addition of closed loop pollution controls and computer control centers has only exacerbated the complexity and reduced efficiency. As will be seen from the detailed discussion below, the method of the present invention greatly simplifies the design of the general purpose engine, making it more efficient and thus more economical.

Also developed during the twentieth century were other types of engines including rocket engines of both solid and liquid fuel types, jet engines and electric motors, including the modern fuel cell technologies. Rocket and jet engines, while suitable for certain tasks such as military aircraft or space exploration, find little practical use in the general purpose engine area. Thus while both types of engines are simple in design, both suffer from inefficiency and impracticality when looking at general purpose engine applications.

Also disadvantageous is the hazardous nature of both rocket and jet engines. Although simple in design, due to the high operating pressures and extreme volatility of the fuels required, these types of engines are not suitable for the general purpose tasks mentioned above. Finally, both rocket and jet engines are expensive to operate due to the constant maintenance required to guarantee that the tight tolerances and critical components remain within specifications.

Electric motors for providing power are advantageous for fixed installations where a ready source of electricity is available. However, for use in those applications where electricity is not available, or where the power plant must be portable, as in a vehicle, electric motors and associated technologies have not yet matured to the point where they are economical. Fuel cell technology provides a promise for simple, efficient and clean power for electric motors in the future, but is not ready today.

What is required is an engine design that has the operational simplicity of a jet engine but the low cost, safety and maintenance ease of an internal combustion engine. The engine disclosed by the present invention provides such a design.

SUMMARY OF THE INVENTION

The method and apparatus of the present invention discloses a power plant operating at low inlet pressure and temperature using a combination of conventional internal combustion engine techniques and jet engine techniques. The combination of a unique combustion chamber design, a novel variable impedance blade set turbine and a closed loop control system allows a variable resonant frequency for combusted gases. As the resonant frequency is approached a control mechanism uses sensor data to maintain the operating point such that maximum power output is achieved for a given throttle setting. The combination of the unique combustion chamber design, multiple fuel injector/ sparking device pairs, finely atomized fuel, excess oxygen and the closed loop control system further provides a very linear power curve with low exit hydrocarbon pollution levels and high fuel efficiency.

Numerous embodiments of the present invention use the same general principle. Low pressure air is pulsed into a uniquely shaped combustion chamber where it is mixed with a precise amount of fuel controlled by an injector and then coupled to a novel turbine. A sparking device is located in close proximity to the fuel injector. The geometry of the chamber, including the output port, is such that upon the ignition of the fuel and pulsed air mixture a very rapid explosion occurs which completely expends the fuel. Due to the geometry of the chamber, the force of the exploding gases is focused at the output port. The expended gases exiting the chamber at or near supersonic velocity can be impinged directly on a load to accomplish work, for example, an impact rotor designed so as to have no sonic waves reflected back into the combustion chamber.

Just after the pulse of energy exits the chamber, the next pulse of air and fuel is allowed into the chamber. Again, due to the excess air, he fuel/air mixture is completely expended, leaving minimum unburned fuel to create hydrocarbon emissions. The geometry of the chamber, in conjunction with a positively controlled feedback system that employs a series of sensors to determine the operating point of the power plant, determines the frequency of the pulses. The chamber has an inherent resonant frequency based upon the inlet valve diameter, chamber volume and exit orifice size. At resonance the fuel/air mixture may be completely combusted, creating an optimally efficient operating point where maximum pulsed energy velocity may be extracted from the chamber while generating a minimum of pollutants.

In a first embodiment of the present invention, a chamber with a single injector/sparking device pair and a fixed output port is used. This power plant has a single resonant frequency and is suitable for many lower power requirement tasks such as irrigation pumping or electrical power generating loads. In a second embodiment of the present invention, a larger chamber with a plurality of injector/sparking device pairs disposed throughout the chamber and a tunable output port is used to generate significantly higher power outputs suitable for powering vehicles and other heavy duty workloads. The tunable output port combines with variable input pulsed air pressure and fuel/air mixture to vary the resonant frequency creating a range of optimum power settings advantageous for reacting to, for example, variable throttle settings. Both embodiments use a CPU [Central Processor Unit] to manage the complex simultaneous adjustments that must be made to achieve, and then maintain resonance. These adjustments include, but are not limited to, varying the input fuel and air, changing the rate of the input valve cycle, firing some or all of the injector/sparking device pairs, and setting the output orifice opening.

Both embodiments of the present invention can utilize a novel turbine for power extraction. The turbine is configured in such a way as to present low impedance to the exiting gases at startup and at low power operating points, then maintains its impedance as the power is ramped up. This is accomplished by a unique set of turbine blades that are positioned by the control mechanism. The shaft of the turbine is coupled to a work load in the customary manner.

The present invention overcomes the disadvantages of the prior art. Since it uses standard fuel it is safer than rockets or engines using high volatility fuels. Since each explosion completely expends the fuel, very low levels of hydrocarbon emissions are produced. The design of the power plant is such that it uses the energy of the explosions directly. This reduction in design complexity translates into both increased fuel efficiency and reduced cost of manufacture and maintenance. These and other advantages of the present invention are discussed in detail below in conjunction with the drawings and figures attached.

BRIEF DESCRIPTION OF THE DRAWINGS

FIG. 6: is a partial cross-section of the turbine used in a preferred embodiment of the present invention.

DETAILED DESCRIPTION OF PREFERRED EMBODIMENTS

Figure 1:
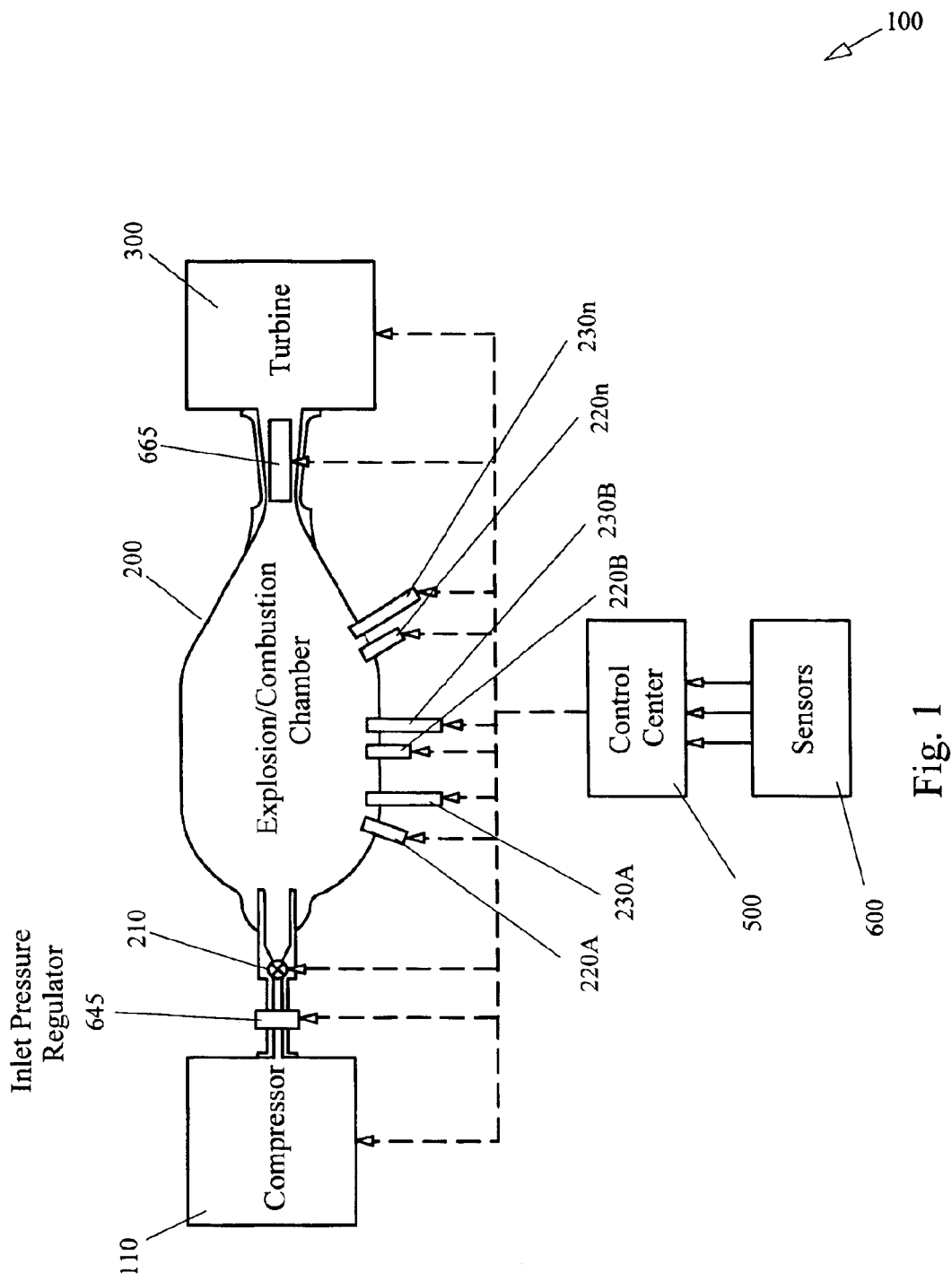
FIG. 1: is an overall view of a power plant system that may make use of the present invention.

As described briefly above, the present invention combines operational aspects of both internal combustion and jet engine technologies to provide an economical, low hydrocarbon emissions power plant useful for a broad range of applications. FIG. 1 provides an overall power generating system 100 typical of that which could be used in conjunction with the present invention. Note that this system is exemplary only, thus no limitation is implied by the diagram. For example, while the exemplary system shown is driving a turbine to produce electricity, the present invention could just as easily be coupled to a drive shaft mechanism for propelling a vehicle. For the remainder of the detailed discussion the system of FIG. 1 will be used, however, it will be understood that the discussion of the present invention applies to any power plant application based upon the method and apparatus of the present invention.

A compressor 110, driven by electrical or mechanical feedback means, provides low pressure air to the inlet of the present invention. In a preferred embodiment the inlet air pressure is ≈50 psi, but use of inlet air pressures greater or lesser than this amount should not be read as a limitation on the scope of the invention. An adjustable input pressure regulator 645 provides a constant input pressure to the explosion/combustion chamber 200. As will be discussed in detail below, the air is pulsed into the explosion/combustion chamber 200 of the present invention by valve 210 under the control of solenoid (not shown in FIG. 1.) The use of multiple injectors aids in creating the very finely atomized fuel which supports rapid, complete combustion.

At generally the same time a specified amount of fuel is injected into the explosion/combustion chamber 200 by fuel injectors 220A, 220B and 220n. In a preferred embodiment, the fuel/air ratio runs between 1:15 and 1:25. The excess amount of air assists in reducing exit pollution, lowering the combustion temperature and adding to the mass flow of the gases transiting the chamber. It will be recognized that other fuel/air ratios could be used without departing form the spirit of the invention. As described below, and depending upon the design of the explosion/combustion chamber, multiple injectors are used to provide even fuel air distribution which greatly aids in a rapid, uniform and complete combustion of the fuel/air mixture.

Associated with each of the fuel injectors 220A, 220B and 220n is a sparking device 230A, 230B and 230n respectively. The sparking devices are used to ignite the fuel/air mixture as is the case with a traditional internal combustion engine. Each of the fuel injectors is in close proximity to its related sparking device. As described in detail below, this helps to insure rapid, complete combustion. Of course, as is known in the art, if the explosion/combustion chamber achieves a sufficient temperature, dieseling will occur, thus the control mechanism shifts to a diesel control process as opposed to a sparking device process.

The fuel injector/sparking device pairs are located at geographically strategic points within the volume of the explosion/combustion chamber 200. Note that while the figure shows the fuel injector/sparking device pairs being located linearly along the long axis of the explosion/combustion chamber, it will be understood that the disposition of the fuel injector/sparking device pairs could be radial or a combination of both linear and radial without departing from the spirit of the invention.

Explosion/combustion chambers of differing design may employ differing numbers of injectors. For example, a small power plant may require only one injector/sparking device pair to produce the amount of power output desired for a smaller application, whereas a plurality of injectors may be required to produce a range of power. In the example shown in FIG. 1, three sets of injector/sparking device pairs are used. The output of the explosion/combustion chamber is coupled to a turbine load 300 via a tunable output port 665. The output port, as will be described in detail below, accomplishes several functions, but mainly, the output port is set by the control system to achieve optimum velocity of the exploded fuel/air mixture. One of the primary benefits of the present invention is that it uses the momentarily supersonic or near supersonic stream of the exploded fuel/air mixture to directly drive a load.

Control Center 500 contains the necessary mechanisms to control the various aspects of operation of the present invention. In the embodiment described below, the control mechanism is a digital controller, however, more traditional control mechanisms could include mechanical means such as cams, rods, springs and the like without departing from the spirit of the invention, thus the control mechanism described is exemplary only. Control Center 500 receives inputs from a plurality of sensors 600 that provide data on the status of the system. Using the data from the sensors 600 the Control Center 500 adjusts operating parameters to insure that the explosions occur at or near resonance thereby achieving maximum velocity of the exploded fuel/air stream through the explosion/combustion chamber 200. Regardless of the type of controller used, it is key to the operation of the present invention.

Figure 2:
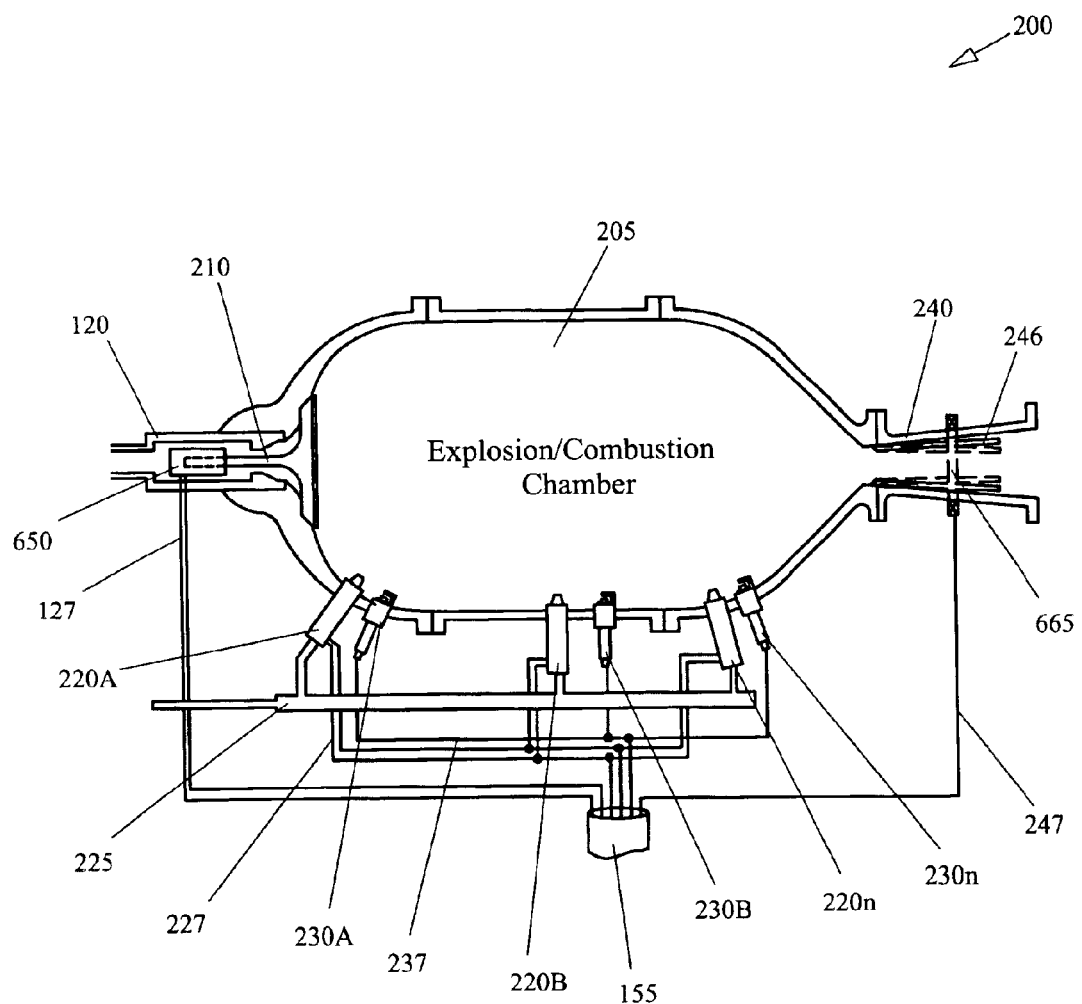
FIG. 2: is a more detailed view of the components of the explosion/combustion chamber of a preferred embodiment of the present invention.

Turning now to FIG. 2, a more detailed diagram of the explosion/combustion chamber 200 of the present invention is shown. The explosion/combustion cavity 205 is provided with an inlet port 120 and an output port 235. The inlet port 120 contains air inlet valve 210 and solenoid 650. The solenoid 650 has control wires 127 that are connected to the digital control device described below. The function of the air inlet valve 210 is to open to allow low pressure air into the explosion/combustion chamber 205 but to then prevent the high pressure exploded fuel/air mixture from flowing backward into the inlet air supply. In this way the air inlet valve 210 operates in a manner not unlike an intake valve in the cylinder of an internal combustion engine. In the embodiment shown the air inlet valve is of the standard internal combustion beveled edge type, but, as will be understood, any mechanism able to withstand the high pressure from the explosion of the air/fuel mixture and that opens and closes to allow low pressure air to enter the explosion/combustion cavity 205 may be used.

As discussed above, in the exemplary embodiment the explosion/combustion cavity 205 is fixed with three sparking device/injector pairs 220A/230A, 220B/230B and 220n/230n respectively. The injectors are connected to fuel manifold 225 which may be of any design that provides a constant pressure source of fuel to the manifold. By way of example, a mechanical fuel pump or an electrical fuel pump could be used to provide the appropriate fuel pressure to the fuel manifold 225. Since methods of providing fuel pressure are well understood none are discussed in any further detail to aid in clarity. Fuel injectors 220A, 220B and 220n in the exemplary embodiment of the present invention are of the conventional automotive type and are controlled by signals from the digital control device via control wires 227. It will be recognized that other methods of injecting fuel into the explosion/combustion cavity 205 could be used without departing from the spirit of the invention.

Sparking devices 230A, 230B and 230n are located in close proximity to their respective injectors and are controlled by the digital control device via control wires 237. In an exemplary embodiment, the sparking devices are of the automotive spark plug type, but as will be understood, any sparking device could be used without departing from the spirit of the invention.

In one preferred embodiment of the present invention the explosion/combustion chamber 200 is approximately 12 inches in length and six inches in diameter. At approximately five inches along the longitudinal axis the explosion/combustion chamber 200 tapers at an approximate 45 degree angle terminating at the outlet port 235. In this preferred embodiment the inlet valve 210 is of the automotive type and is approximately two inches in diameter while the outlet port 235 is variable from approximately one to two and a half inches in diameter.

In operation all fuel injectors operate simultaneously to inject a precise and constant amount of fuel at strategic locations throughout the explosion/combustion cavity 205. Then, after a short delay, all sparking devices are fired simultaneously, igniting the air/fuel mixture within the explosion/combustion cavity 205. One novel feature of the present invention is that the fuel/air volume remains constant. Variable power is obtained by varying the input air pressure and valve timing. For lower power settings the valve remains open longer and the input air pressure is lower than for higher power settings where the valve opening time is shorter and the input air pressure is higher. In this way the present invention is able to achieve a thermal efficiency of approximately 50%, compared to a conventional internal combustion engine operating at a thermal efficiency of approximately 35%. A benefit of the higher thermal efficiency, lower overall operating temperature point, and constant fuel/air volume is a reduction in the level of pollutants. Although these pollutants still exist they are substantially lower than the levels emitted by conventional internal combustion engines.

Because both the fuel and the spark have been distributed throughout the chamber, complete combustion is achieved, leaving very little unexpended fuel. Further, due to the geometry of the explosion/combustion cavity 205, the energy of the explosion is focused at the output port 235. The combination of complete combustion and focused energy causes successive explosions to create a pulsed stream of expended fuel/air gases. Again due to the geometry of the explosion/combustion cavity 205, there exists a resonant frequency such that when the proper explosion rate is set by the digital control device a maximum, momentarily super-sonic velocity of gases is achieved. For a given explosion/combustion chamber design this resonant frequency can be varied by changing the inlet air pressure, the explosion rate and/or the output port geometry.

The output port 235 can be varied as described just above. This is accomplished in the exemplary embodiment by movable vanes 246. These vanes may be opened or closed by vane control 665 via a signal from the digital control device using control wire 247. In some applications, a check valve may be added at the output port of the explosion/combustion chamber. As described below, the various tunable and/or variable components of the present invention have associated sensors that provide analog signals proportional to the state of the associated component. These signals are used to monitor the operational characteristics of the system and drive adjustments to achieve resonance. Wiring harness 155 provides a mechanically protected conduit for the various control wires from the sensors and drive devices to the digital control device.

Figure 3A:
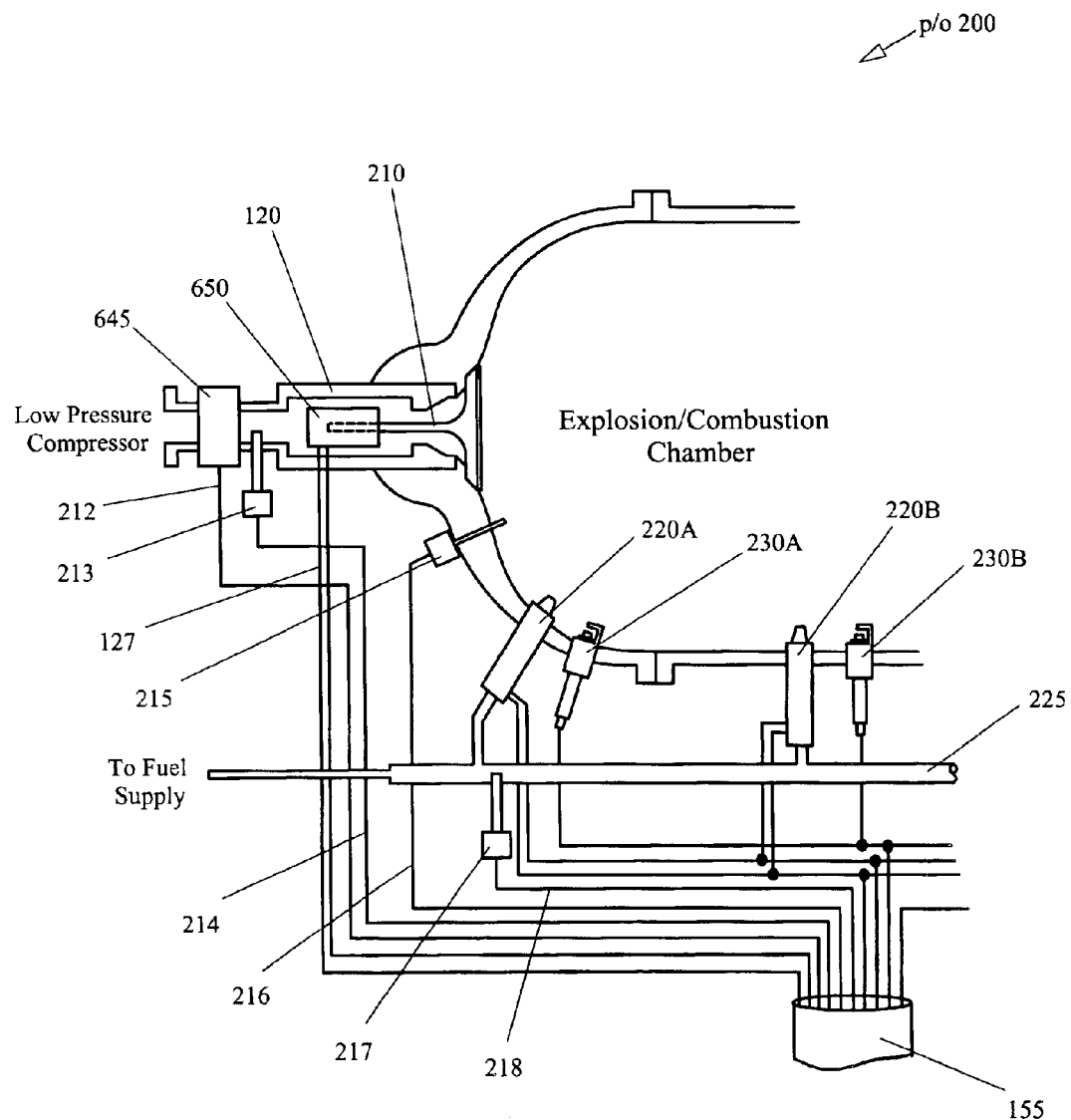
FIG. 3A: provides details of the input section of the explosion/combustion chamber that is used in the preferred embodiment of the present invention.

Referring now to FIG. 3A, the inlet end of the explosion/combustion chamber 200 of the present invention is shown. Input Pressure Regulator 645 maintains the input pressure to the explosion/combustion chamber 200. The Pressure Regulator 645 is adjustable under the control of Control Center 500 via control wire 212. In a preferred embodiment, Pressure Regulator 645 is a type 3212/3222 from Marsh Bellofram, Newell, W. Va. Inlet valve 210, inlet port 120, solenoid 650 and solenoid control wires 127 all operate as described above. Note however, that in addition to these components, there is an inlet air pressure sensor 213 in the inlet port 120 connected to Control Center 500 via control wire 214. The function of this sensor is to provide incoming air pressure data to the digital control device described below. Also notice that an explosion/combustion chamber temperature sensor 215 is located inside the chamber and is connected to Control Center 500 via control wire 216. The function of this sensor is to pass data related to the internal operating temperature of the present invention to the digital control device. This data is used to assist in the determination of when the resonant frequency has been reached and to assist in determining if an emergency shutdown is required due to explosion/combustion chamber over-temperature.

Fuel injector/sparking device pairs 220A/230A, and 220B/230B work as described above, as does the fuel manifold 225 and control wire harness 155. Note however that there is also shown a fuel pressure sensor 217 connected to Control Center 500 via control wire 218. The function of this sensor is to provide fuel pressure data to the digital control device described below. Each of the sensors just described may be of any type that provides the proper signal and can withstand typical engine operating environments without departing from the scope of the invention. In the exemplary embodiment of the present invention the sensors are typical of those used by the automotive industry for the same or similar purposes. Operation of these sensors is well understood thus no detailed discussion is provided. However, that lack of a detailed discussion of the sensor operation should not be read as a limitation on the scope of the invention.

Figure 3B:
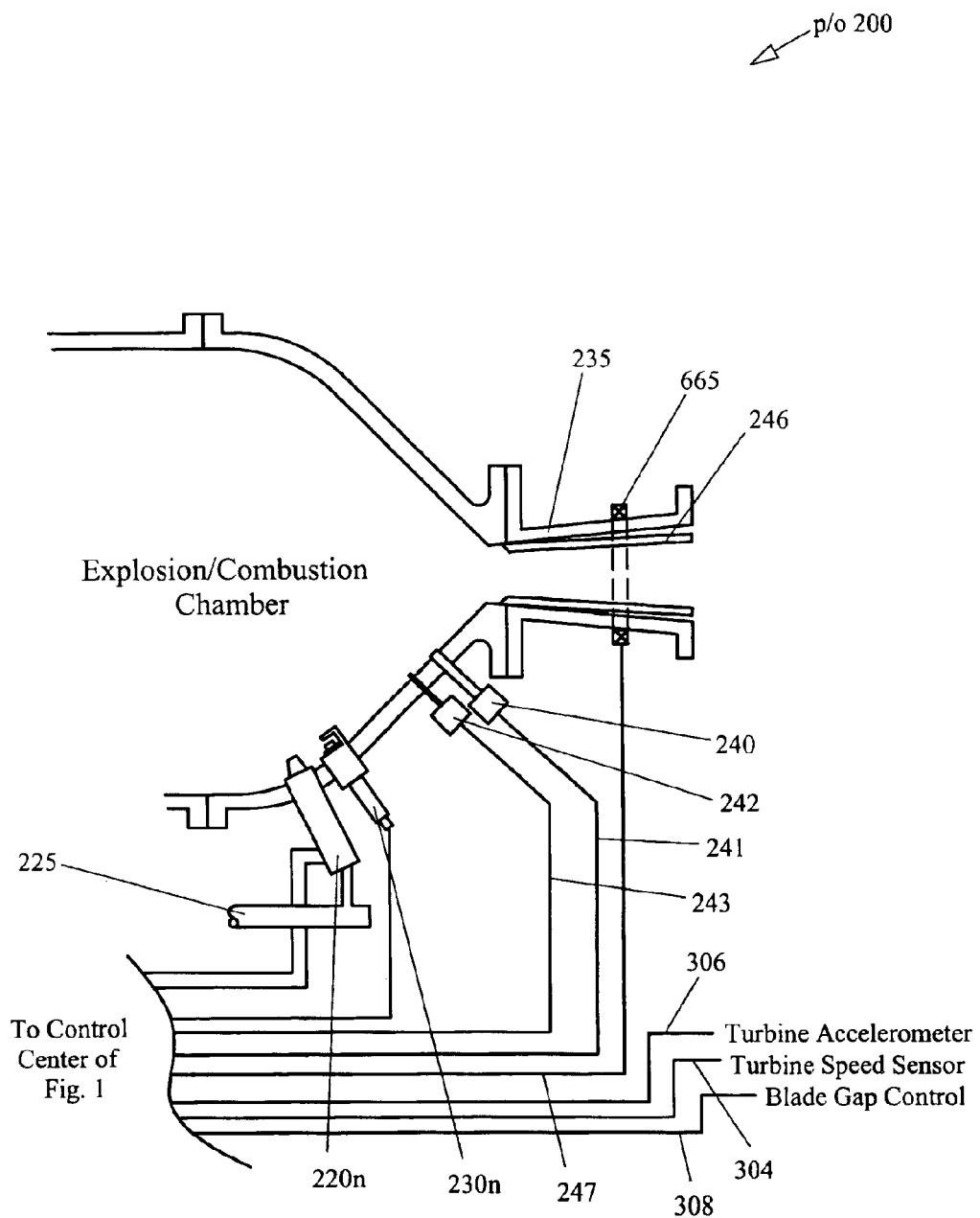
FIG. 3B: provides details of the output port of the explosion/combustion chamber that is used in the preferred embodiment of the present invention.

Turning now to FIG. 3B, the output port end of the explosion/combustion chamber 200 of the present invention is shown. Fuel injector/sparking device pair 220n/230n and fuel manifold 225 operate as described above. Also shown is an exit pressure sensor 240 and exit temperature sensor 242. These components send their related data to the digital control device via control wires 241 and 243 respectively. A turbine, discussed in detail below, is connected to the output port 235 in the exemplary embodiment of the present invention, as shown in FIG. 1 above. In some applications, a check valve may be added at the output port of the explosion/combustion chamber.

Looking at output port 235 in more detail, recall from above that one parameter used to adjust the operating frequency of the present invention is to vary the diameter of the output port. Variable vanes 246 are used to accomplish the variation in diameter. Variable vanes 246 can be of any type known in the art, for example, the iris type used in conventional jet engines. Variable vanes 246 are controlled by vane controller 665 via control wire 247. Also shown in FIG. 3B are control wires 304, 306 and 308. These wires attach to the turbine speed sensor, turbine accelerometer and turbine blade gap control discussed in detail below.

Figure 4:
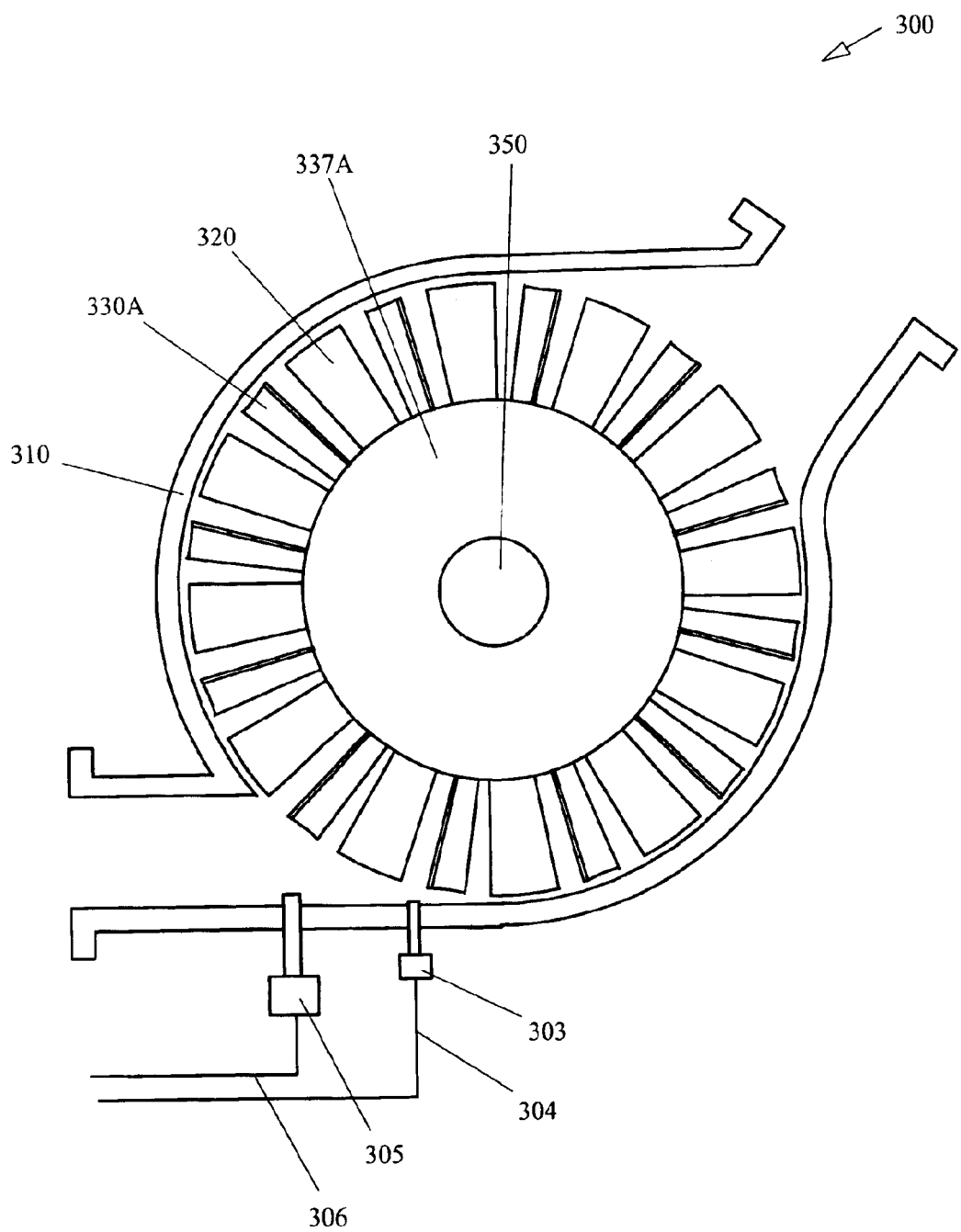
FIG. 4: is a cut-away view of the turbine that is used in a preferred embodiment of the present invention.

Referring now to FIG. 4, a cross sectional side view of the turbine 300 is shown. The novel design is comprised of three sets of vanes, one stationary and two movable. The stationary vane set 320 is fixably attached to the shaft 350, while the movable vane set 330A is permitted to slide toward and away from the fixed vane set 320. (Note that only the near side movable vane set 330A is shown in this view. Moveable vane set 330B lies on the far side of the stationary vane set 320.) This is accomplished by fixably attaching the movable vane set 330A to sliding member 337A. (Note that only the near side sliding member 337A is shown in this view. Sliding member 337B lies on the far side of the stationary vane set 320.) Sliding member 337A is captured to the shaft 350 in such a way as to permit lateral motion along the axis of the shaft 350 but force rotational motion about the axis of the shaft 350, for example, by means of a spline. The purpose and operation of these two sets of vanes is discussed in detail below, but generally, this unique configuration provides a variable impedance to exploded gases entering the turbine inlet to maintain low back pressure from startup to maximum RPM.

Turbine casing 310 has an inlet and outlet configured to allow the exploded gases to exit without interrupting the gas flow by severe angles or long egress path. In a preferred embodiment, the exit is located approximately 235 degrees from the inlet. This angle permits the capture of a maximum amount of energy from the entering gases while limiting the travel path to the exit. As will be understood, other exit locations could be used without departing from the spirit of the invention, thus the angle chosen for the preferred embodiment is exemplary only. Located at the inlet of the turbine 300 are a speed sensor 303 and an accelerometer 305. The speed sensor 303 is used to monitor the speed of the output shaft 350 while the accelerometer 305 is used to monitor the vibration of the turbine assembly. As is known, excess vibration is an indication that the vane system may be out of balance, requiring immediate attention. These sensors are connected to the control center 500 via signal wires 304 and 306 respectively.

Figure 5A:
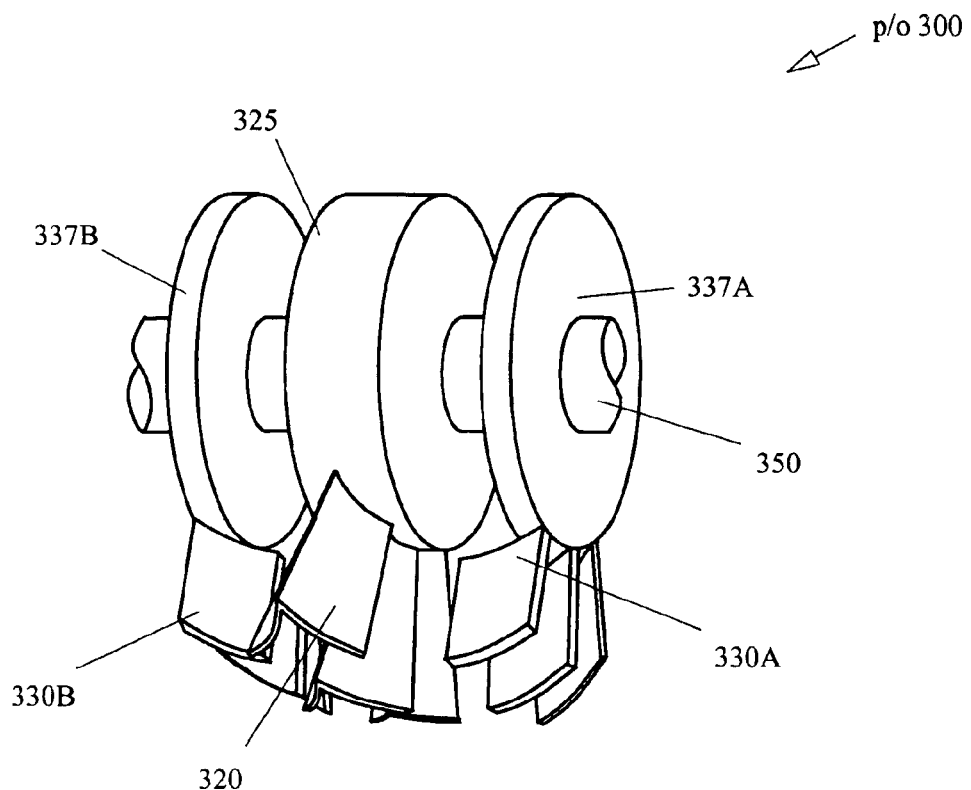
FIG. 5: provides the turbine blade detail of the variable impedance blade set of the turbine used in a preferred embodiment of the present invention.

Looking now at FIG. 5, the details of the vane set of the turbine 300 are shown. Note that only three blades are shown for clarity, but as was shown in FIG. 4, the blades are disposed around the entire circumference of the shaft 350. Starting with FIG. 5A, the vane set is shown in the low impedance state. Moveable vane sets 330A and 330B are in their outermost positions, allowing inlet gases to escape through the gap between the moveable vanes and the fixed vanes 320 which are mounted on hub 325. The purpose for this arrangement is to allow the turbine shaft to get up to speed under low RPM/power settings without bogging down. The shape of the fixed vane 320 has been chosen to direct the inlet gases toward the movable vanes 330A and 330B.

As the inlet gases increase in frequency, the turbine 300 increases in speed. At that time, and under control of the control center 500, the movable vanes 330A and 330B slide inward toward the fixed vane 320. The inward and outward movement of the moveable vanes 330A and 330B is accomplished by moving sliding members 337A and 337B by means of a blade gap control mechanism (not shown). This mechanism receives control signals from the Control Center 500 via control wire 308. Mechanisms of this type are well understood in the art, for example, a throw-out bearing and spring arrangement, thus the exact details of the mechanism are not shown since they do not directly impinge on the method of the present invention. This lack of a detailed discussion should not be read as a limitation on the scope of the invention.

Figure 5B:
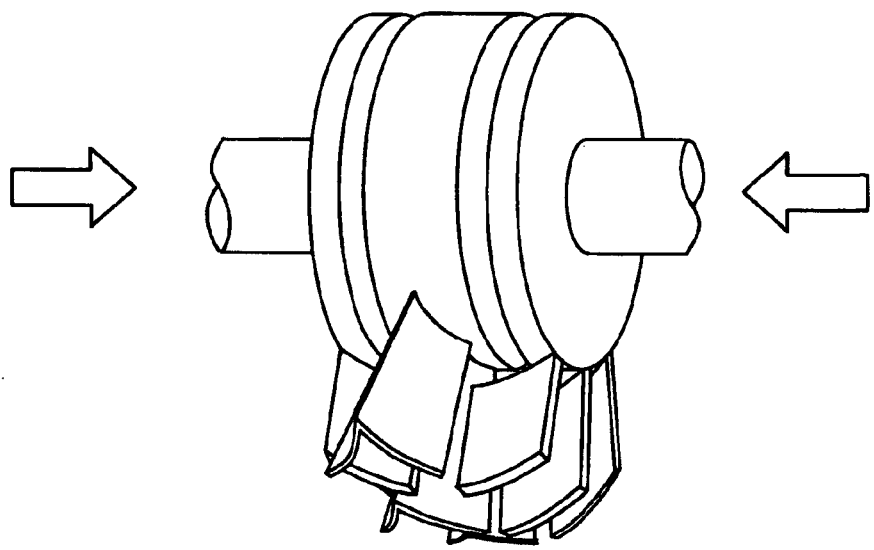

At peak power, as shown in FIG. 5B, the moveable vane sets 330A and 330B have completely eliminated the gap between themselves and the fixed vane set 320. In a preferred embodiment, the moveable vanes reside midway behind the fixed vanes. In this configuration, all of the power of the inlet gases impinge on the combination of the fixed and moveable vanes. As will be obvious, this is the maximum impedance state. Since the gap between the fixed and moveable vanes sets can be infinitely varied, the resulting impedance presented to the inlet gases can be infinitely varied as well. This is a significant advantage because it allows for very precise power point operation.

Turning to FIG. 6, a cross sectional view of the turbine 300 is presented. In FIG. 6A, the moveable vanes 330A and 330B are in their most outward, or low impedance, configuration, thus there exists a gap between the moveable vanes 330A and 330B and the fixed vane set 320. As can be seen, turbine casing 310 has bearings 355 on either side of the vane assembly. Shaft 350 has sliding members 337A and 337B mounted to it. Note that in order to trap the inlet gases within the vane assembly, the moveable members 337A and 337B have side baffles 338A and 338B. The moveable vanes sets 330A and 330B are attached to these baffles. As the sliding members 337A and 337B move inward or outward, the baffles 338A and 338B force the inlet gases to impinge upon the vanes sets rather than escaping to the sides. Skirts 335A and 335B seal any gases that may have bled around the baffles inside the turbine casing 310. In FIG. 6B the vanes sets are again shown in the high impedance state. The fixed vane set 320 lies in front of the moveable vanes sets 330A and 330B. Note that while in the preferred embodiment discussed above, there exists no overlap between the fixed and variable vanes, it is possible to provide an overlap between the two sets of vanes as shown in FIG. 6B to improve the performance characteristics of the turbine, thus no limitation should be read on the non-overlapping blade configuration.

Figure 7:
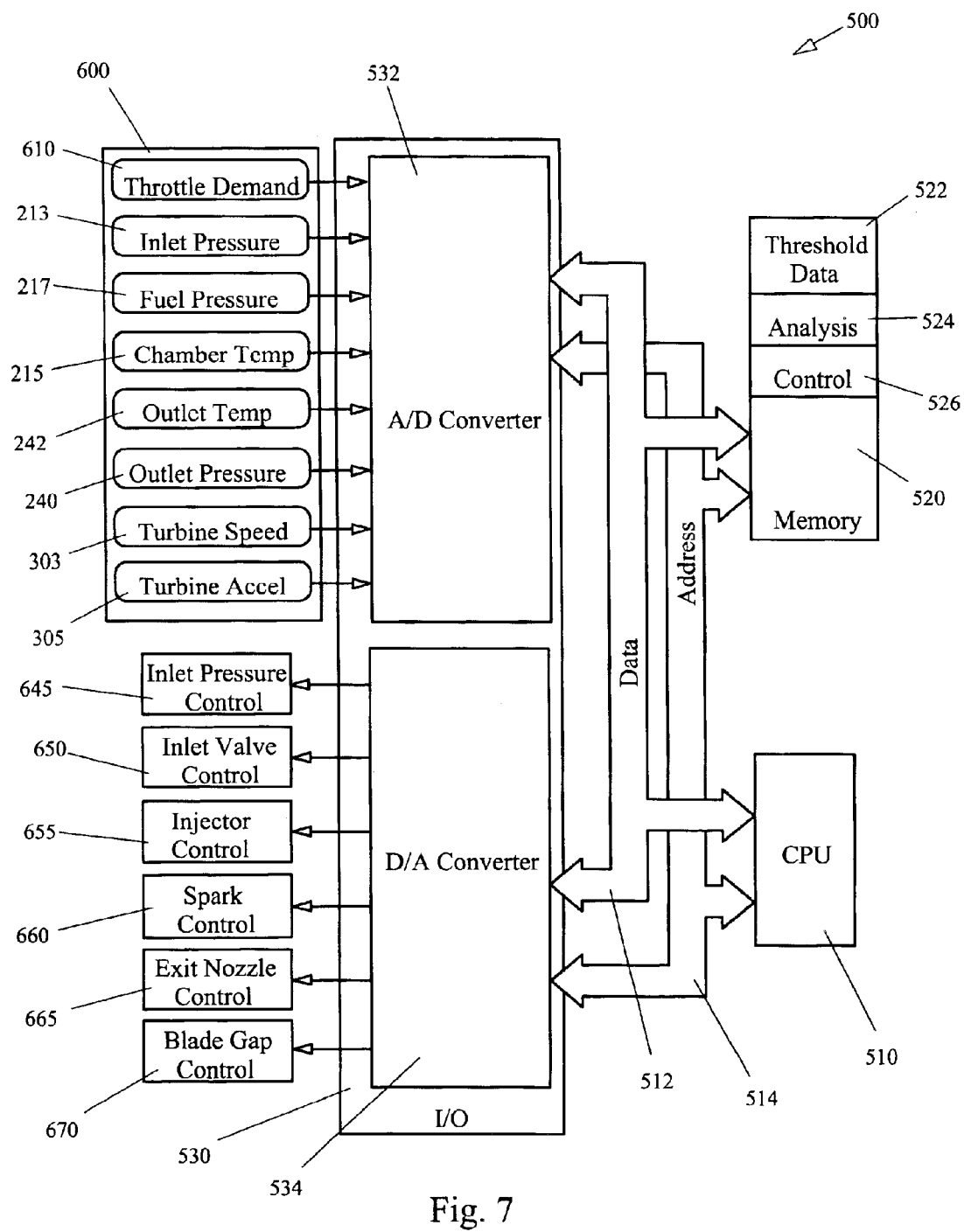
FIG. 7: is a block diagram of a control system that may be used to operate the present invention.

FIG. 7 presents a detailed block diagram of the digital control device 500 used with the preferred embodiment of the present invention. A central processor unit [CPU] 510 is coupled to a memory 520 via data bus 512 and address bus 514. Each of these components operate in the customary manner and are thus not discussed in detail for clarity. Also attached to CPU 510 and memory 520 via data and address buses 512 and 514 respectively are input output [I/O] circuits 530, analog-to-digital converter [A/D] 532 and digital-to-analog converter [D/A] 534. Although not shown for clarity, I/O circuits include, but are not limited to lights and indicators, relays, switches, and other components well understood and used for typical control purposes. In a preferred embodiment the CPU 510 is a ST10F280 embedded flash memory microcontroller from STMicroelectronics in Geneva, Switzerland. In a preferred embodiment memory 520 is contained within and is a part of the CPU 510, but as will be recognized, the memory and CPU units could be separate without departing from the spirit of the invention.

The A/D 532 accepts inputs from the sensors that describe the operational characteristics of the power plant in real time. In a preferred embodiment, the A/D 532 is contained within and is a part of the CPU 510, but as will be recognized, the A/D unit could be separate without departing from the spirit of the invention. A/D 532 receives analog signals from the sensor array 600 and converts them to digital signals for use by CPU 510. The sensor array 600 in a preferred embodiment is comprised of throttle demand sensor 610, inlet pressure sensor 213, fuel pressure sensor 217, chamber temperature sensor 215, outlet temperature sensor 242, outlet pressure sensor 240, turbine speed sensor 303, and turbine accelerometer 305. Each of these sensors operate as described above in conjunction with the discussion of FIGS. 3A and 3B. It will be recognized that more or less sensors could be used without departing from the spirit of the invention thus the scope of the invention is limited only by the claims.

The D/A 534 accepts command input from the CPU 510 in the form of digital signals and converts them to analog drive signals for the various control components. In a preferred embodiment, the D/A 534 is implemented in software contained within memory 520 which is a part of the CPU 510, but as will be recognized, the D/A unit could be separate without departing from the spirit of the invention. Inlet valve control 650 provides the drive for the inlet valve 210 of FIG. 3A. Injector control 655 provides the drive for the fuel injector(s), for example, fuel injectors 220A and 220B of FIG. 3A. Spark control 660 provides the firing signal for sparking device(s), for example sparking devices 230A and 230B of FIG. 3A. Exit nozzle control 665 provides the control signal for variable vanes 246 in FIG. 3B. Finally, Blade Gap Control 670 provides control for the movable turbine vanes 330A and 330B in FIG. 6A.

In operation, the analog inputs from the sensors are converted to digital signals by A/D 532, processed by the software program executing in memory 520 under the control of CPU 510. Depending on the state of the incoming sensor signals, the D/A 534 drives the various control components to achieve the proper operational state. By way of example, threshold data module 522 contained within memory 520 uses the incoming sensor data to compare actual real-time operating conditions to predetermined setpoints. As described in greater detail below, analysis module 524 uses the differences between the predetermined setpoints and the real time data to calculate adjustments needed to drive the present invention toward the optimum operational condition. Based on the commands from analysis module 524, control module 526 issues command input to D/A 534. In this way a closed loop control mechanism provides positive control over the operation of the present invention.

Figure 8:
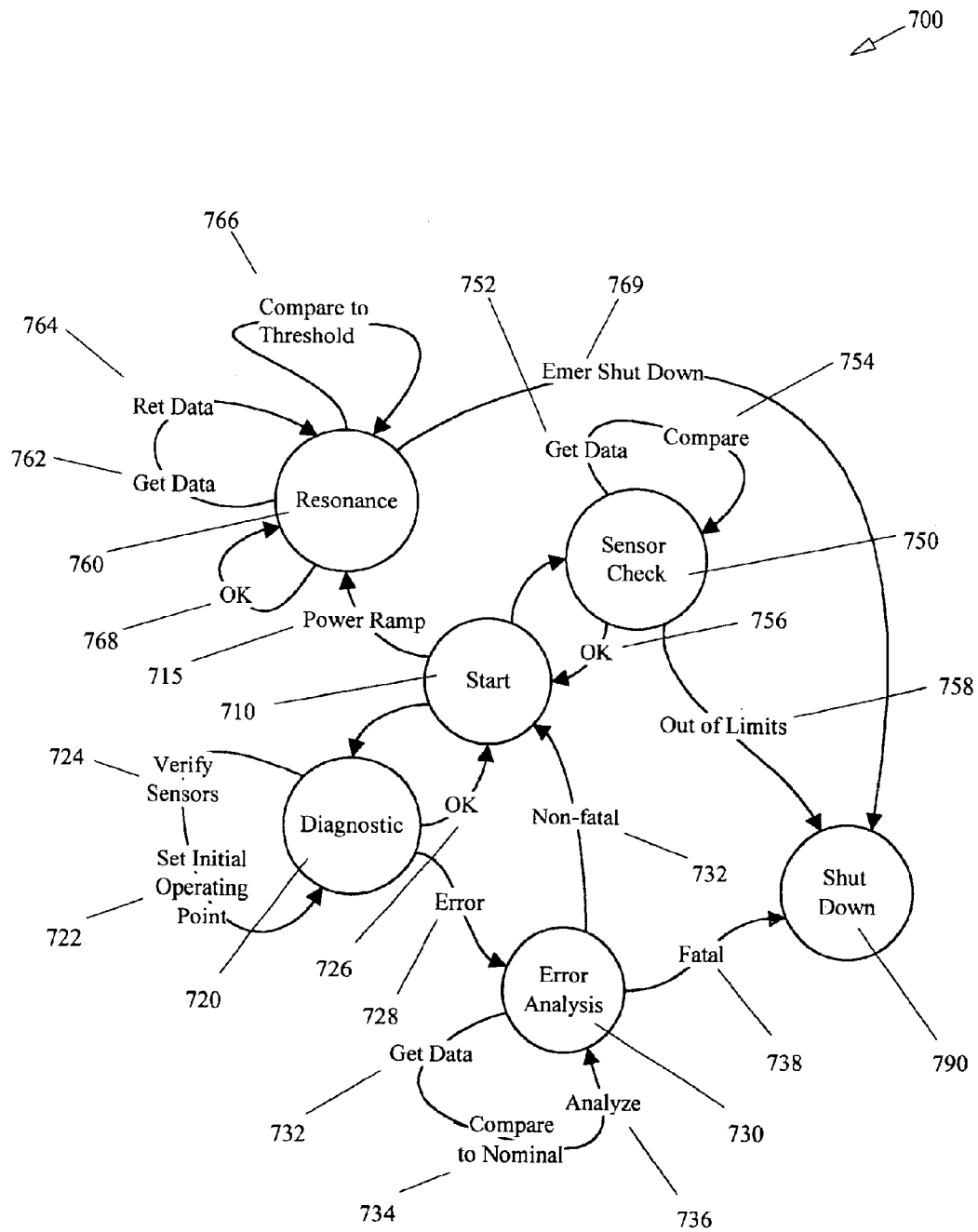
FIG. 8: is a state diagram that describes a control method that may be used to control the operation of the present invention.

FIG. 8 shows a state diagram 700 which provides the operational detail of the present invention. At Start 710 a signal is received to begin operation of the present invention. This could be from a key switch of the sort common in automobiles, or some other switch closure indicating that operation is desired. Process flow enters the Diagnostic state 720. Here the various sensors associated with the operation of the present invention are checked at Verify Sensors 724 to determine the initial condition of the system. The initial operating point is set at Set Initial Operating Point 722. If all sensors are nominal and the initial operating point is set, the OK signal 726 passes control back to the Start state 710. If, however, an error is found in any of the sensors, for example, if the output temperature sensor indicates an over-temperature condition, the error is reported at Error 728 and the Error Analysis state 730 is entered.

Error analysis proceeds by fetching data from memory at Get Data 732. The data is then compared to preset reference data at Compare to Normal 734. An analysis of the reported data compared to the reference data occurs at Analyze 736. If the reported error is non-fatal the error analysis reports a non-fatal error at Nonfatal 732 and re-enters the Start state 710. An example of a non-fatal error would be an over-temperature reading at the output port with no turbine speed or fuel pressure. This situation might occur if the present invention had been recently operational but then shut down. At the time the new operational request is received the output temperature remains high even though no fuel pressure exists and the turbine load is idle.

If the error analysis decision indicates that the error is fatal, the error is reported at Fatal 738 and the process enters the Shut Down state 790. In the shut down state the present invention is halted by, for example, shutting off fuel to the injectors, ceasing to provide ignition signals to the sparking devices, and other steps required to elegantly cease operation of the system. An example of a fatal error would be zero fuel pressure in the fuel manifold even though power is applied to the fuel pump. It will be obvious that the exemplary errors described above are not the only errors that would cause Error Analysis state 730 to report errors, thus the lack of an exhaustive discussion of the many types of both fatal and non-fatal errors should not be read as a limitation on the scope of the invention.

Returning now to the Start state 710, the process begins a background looping task that cycles through the Sensor Check state 750 on a preset time interval. In a preferred embodiment of the present invention the preset time interval is a maximum of two milliseconds, however, other more or less frequent loops could be made without departing from the spirit of the invention. At Get Data 752 the process fetches the most current sensor data that has been clocked into memory. At Compare 754 the current sensor data is compared to an operational set point determined by, for example, a throttle setting. The results of the comparison are stored in memory and the process returns to the Start state 710 via the OK signal 756.

Supposing that, at some time either during start up or during normal operation, a condition occurs that causes one or more of the sensors in sensor array 600 to return data that is out of limits. For example, suppose that for some reason the explosion/combustion chamber temperature sensor 215 indicates an over-temperature condition. An out-of-limits signal is generated at Out of Limits 758 and the process enters the Shut Down state 790. In this way the control method of the present invention provides an elegant shut down of the present invention in response to abnormal operational conditions.

Recall that at this point in time the present invention has received a signal to begin operation, has verified that the system is in some nominal, non-fatal state, and has taken a first comparison of current sensor data. A power demand signal is sent at Power Ramp 715 and the process enters the Resonance state 760. Based upon this signal the control process permits air and fuel to enter the explosion/combustion chamber and subsequently sends an ignition signal to the sparking devices(s) causing the mixture in the explosion/combustion chamber to explode. The force of the explosion is focused toward the output port by the geometry of the chamber. The process repeats, increasing the frequency of explosions until the resonant frequency is achieved.

Once the Resonance state 760 has been entered a series of loop routines are executed. The current sensor data are fetched at Get Data 762 and the data are returned to memory at Ret Data 764. At Compare to Threshold 766 the current sensor data are compared to an operational threshold that has been set based on such inputs as throttle demand, temperature and pressure. A check is made to determine if resonance has been reached at OK 768. If resonance has not been achieved the system continues to ramp up to demand power. As will be understood, as the difference between the threshold data and the current sensor data diminishes, the demand signal is reduced. At some point resonance is achieved and the optimum operating point has been reached. At this point the process continues to monitor sensor data to maintain the operating point. If an increased throttle signal is received, a larger demand signal will be sent and the system will adjust fuel and air supplies and, if necessary, shift the resonant operating point to again achieve optimum operating characteristics.

Supposing now that, at some time during normal operations while the present invention is in the Resonance state 760, a condition requiring rapid shut down occurs. By way of example, supposing that the fuel pressure dropped due to a fuel pump failure. To prevent damage to the present invention, the digital control device will issue an emergency shut down signal at Emer Shut Down 769. The process enters the Shut Down state 790 where the method of the present invention elegantly stops operation of the present invention.

One advantage of the present invention is its simple design. Rather than convert the energy of the combusted fuel/air mixture into an intermediate mechanical assembly such as a piston, connecting rod and crankshaft, the explosion/combustion chamber of the present device focus the energy of the explosion at the output port and uses the explosive energy directly. This in turn greatly improves the efficiency of the power generation process translating into, for example, greater miles/gallon for a passenger vehicle.

A second advantage of the present invention is the very low hydrocarbon emissions. Because each succeeding explosion in the explosion/combustion chamber completely consumes the injected fuel, the only output of the present invention is a momentarily supersonic burst of expended gases. Again due to the unique geometry of the explosion/combustion chamber, the expended gases reach a resonant frequency that assists in moving the expended gases toward the output port.

A third advantage of the present invention is that it is scalable. That is, for relatively low power output applications a single injector/sparking device pair may be used. However, for higher power outputs, a plurality of injector/sparking device pairs may be used. This scalability allows common components to be used in various power plant sizes increasing the manufacturing efficiency and serviceability of the present invention. In turn this provides a more economical power plant solution for the consumer.

A fourth advantage of the present invention is flexibility. The operational parameters may be adjusted to use a plurality of combustible materials. For example, propane, natural gas, hydrogen, or any grade of gasoline, ethanol or alcohol may all be fuel sources for the present invention.

A fifth advantage of the present invention is safety. Because the input air pressure is low, conventional material, tools and tolerances may be used to produce the power plant. This advantage reinforces the positive economics of the present invention.

A sixth advantage of the present invention is the ability to finely control operating power points. This is accomplished through the variable impedance turbine blade set and control of the frequency of explosions in combination with variable inlet air pressure and variable outlet nozzle opening. This fine control makes the present invention suitable for applications where precise control of output load is required.

A seventh advantage of the present invention is rapid response at both startup and shut down. Since the explosions in the explosion/combustion chamber can be started very quickly and stopped just as quickly, a power-on-demand capability exists. This eliminates the wasted fuel and added pollutants of engines that require an idle state.

What is claimed is:

1. A hybrid power plant apparatus wherein certain physical aspects of an internal combustion engine and a high pressure turbine jet engine are combined, comprised of:
a tuned port combustion chamber formed by a hemispherical section at the inlet end with a single inlet valve centered at the cap of said hemispherical section, a cylindrical center section containing one or more fuel injector and sparking device pairs disposed longitudinally, radially or a combination of both within said cylindrical center section, and a conical outlet section with a tunable variable geometry output port, said tunable variable geometry output port coupled to a turbine such that a constant volume of modulated low pressure air impulsed at said single inlet valve and fuel injected into said tuned port combustion chamber by said one or more fuel injectors are ignited by said one or more sparking devices creating a pulse of energy which is impinged on said turbine, said low pressure and said fuel being repetitively introduced into said tuned port combustion chamber to create a continuous series of energy pulses, said continuous series of energy pulses occurring at or near a resonant frequency determined by the physical construction of said tuned port combustion chamber.

2. The hybrid power plant of claim 1 wherein a single injector and a single sparking device are used.

3. The hybrid power plant of claim 1 wherein a two or more injectors and a two or more sparking devices are used.

4. The hybrid power plant apparatus of claim 1 wherein said hybrid power plant apparatus is a vehicle engine.

5. The hybrid power plant apparatus of claim 1 wherein said hybrid power plant apparatus is an aircraft engine.

6. The hybrid power plant apparatus of claim 1 wherein said hybrid power plant apparatus is used in combination with an electrical generator.

7. The hybrid power plant apparatus of claim 1 wherein said hybrid power plant apparatus is used in combination with a jet pump.

8. A method for controlling a hybrid power plant wherein operational aspects of an internal combustion engine and a high pressure turbine jet engine are combined, comprised of:
controlling low pressure air at the input opening of a tuned port combustion chamber, said tuned port combustion chamber shaped to achieve resonance at a specified explosion rate;
modulating a valve to prevent said low pressure air at said input opening of said tuned port combustion chamber from escaping back through said input opening;
pulsing said low pressure air into said tuned port combustion chamber at a frequency of resonance of said tuned port combustion chamber;
injecting fuel into said tuned port combustion chamber via a one or more fuel injectors at the same frequency as said pulsing of said low pressure air;
igniting one or more ignition devices at the same frequency as said pulsing of said low pressure air such that the combination of said low pressure air and said injected fuel create an explosion that completely expends said injected fuel before the following pulse of said injected fuel and said low pressure air enters said tuned port combustion chamber;
tuning a variable geometry output port of said tuned port combustion chamber such that at said resonance a constant velocity of expended gas exits said tuned port combustion chamber, said expended gas capable of driving a load, and;
coupling said output port of said tuned port combustion chamber to a turbine such that said constant velocity of expended gas impinges upon the vanes of said turbine thereby generating rotational power.

9. The method for controlling a hybrid power plant of claim 8 wherein said method is implemented by an apparatus comprised of:
a single chip microprocessor, said single chip microprocessor further comprised of;
a central processing unit;
a memory, said memory containing the necessary software instructions to operate and control a hybrid power plant;
an analog-to-digital converter;
a digital-to-analog converter implemented in software, and;
a plurality of input and output interface ports;
a plurality of sensors electrically connected to said plurality of input ports of said single chip processor, and;
a plurality of electrically actuated mechanical controls connected to said plurality of output ports of said single chip processor such that said software instructions contained in said memory within said single chip microprocessor receives electrical signals from said plurality of said sensors connected to said input ports of said single chip processor, operates upon said received signals, then delivers output signals to said electrically actuated mechanical controls connected to said plurality of output ports of said single chip processor in such a way as to cause said hybrid power plant to operate at or near a predetermined frequency.

10. The control method of claim 8 wherein the operating point of a hybrid power plant is determined by varying one or more of input air pressure, input valve frequency, input fuel quantity, output port opening, and vane position of a variable vane turbine.

* * * * *